(12) United States Patent
Yabe et al.

(10) Patent No.: US 6,467,595 B2
(45) Date of Patent: Oct. 22, 2002

(54) DAMPER STRUCTURE, AND LOCKUP CLUTCH PROVIDED WITH DAMPERS OF THE SAME STRUCTURE AND SUITABLE FOR USE IN TORQUE CONVERTER

(75) Inventors: Hiroshi Yabe, Shizuoka-ken (JP); Dai Okamura, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 5 days.

(21) Appl. No.: 09/842,981

(22) Filed: Apr. 27, 2001

(65) Prior Publication Data

US 2001/0035321 A1 Nov. 1, 2001

(30) Foreign Application Priority Data

Apr. 27, 2000 (JP) ........................................ 2000-126783

(51) Int. Cl.[7] ............................. F16H 45/02; F16D 3/12
(52) U.S. Cl. ........................ 192/3.29; 192/212; 464/67
(58) Field of Search ............................. 192/3.28, 3.29, 192/212; 464/67

(56) References Cited

U.S. PATENT DOCUMENTS

| | | | | | |
|---|---|---|---|---|---|
| 4,919,241 A | * | 4/1990 | Koshimo | ................... | 192/3.29 |
| 5,752,884 A | * | 5/1998 | Yabe et al. | ................... | 464/67 |
| 5,899,311 A | | 5/1999 | Yamamoto et al. | ......... | 192/205 |
| 5,941,354 A | * | 8/1999 | Fukushima et al. | ........ | 192/3.28 |
| 6,050,376 A | | 4/2000 | Yabe | ........................ | 192/3.29 |
| 6,079,531 A | * | 6/2000 | Ohkubo et al. | ............ | 192/3.29 |

* cited by examiner

Primary Examiner—Richard M. Lorence
(74) Attorney, Agent, or Firm—Crowell & Moring LLP (57) ABSTRACT

A damper structure is constructed of a core plate, a retainer plate fixed on the core plate, a spring assembly carried on the retainer plate and having at least one spring, and a driven plate arranged coaxially with the spring assembly and having a flange engageable with the spring. The retainer plate is composed of an upper plate and a lower plate. The upper plate is provided with a lug portion formed by slitting a part of the upper plate and bending the slit part. The driven plate is provided with a stopper engageable with the lug portion. The damper structure is suitable for use in a lockup clutch for a torque converter.

6 Claims, 9 Drawing Sheets

DAMPER STRUCTURE, AND LOCKUP CLUTCH PROVIDED WITH DAMPERS OF THE SAME STRUCTURE AND SUITABLE FOR USE IN TORQUE CONVERTER

BACKGROUND OF THE INVENTION a) Field of the Invention

This invention relates to a damper structure suitable for use in a power transmission mechanism of a vehicle.

b) Description of the Related Art

Figure 7:
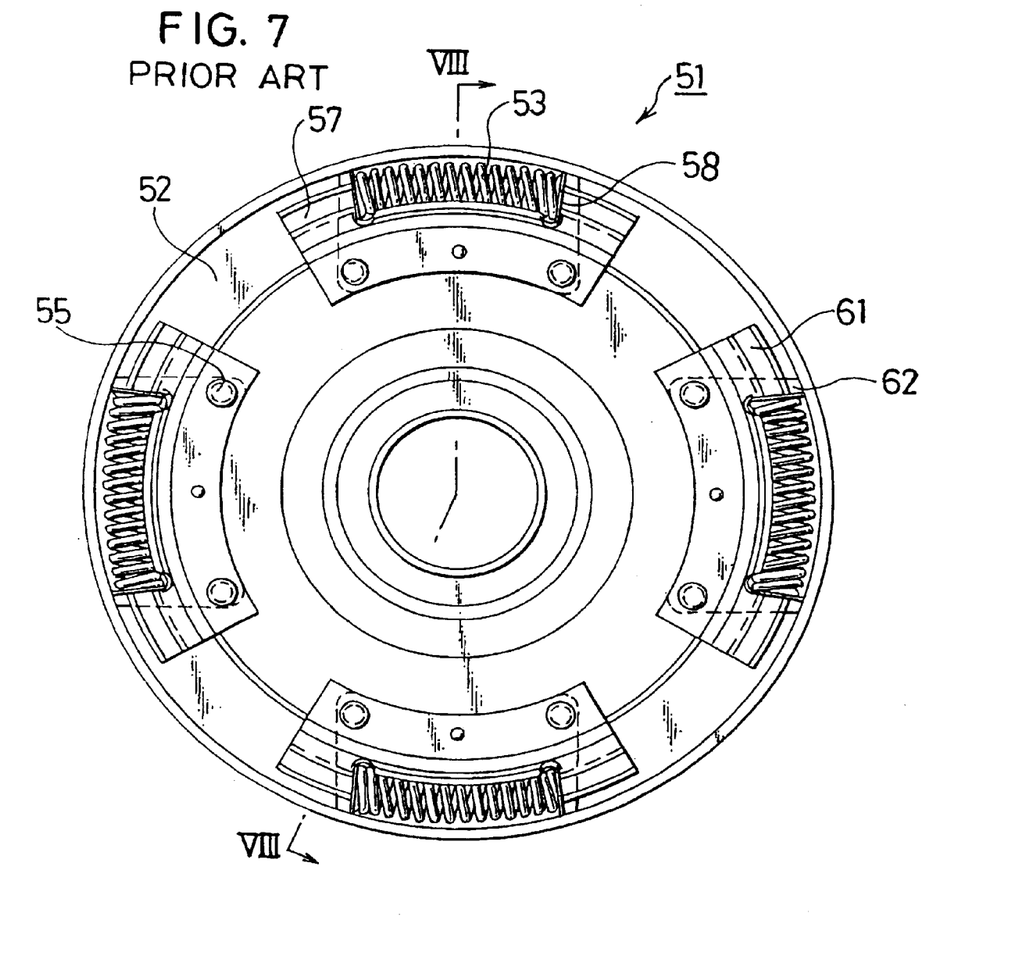
FIG. 7 is a front view of a spring assembly in a conventional damper structure.
Figure 8:
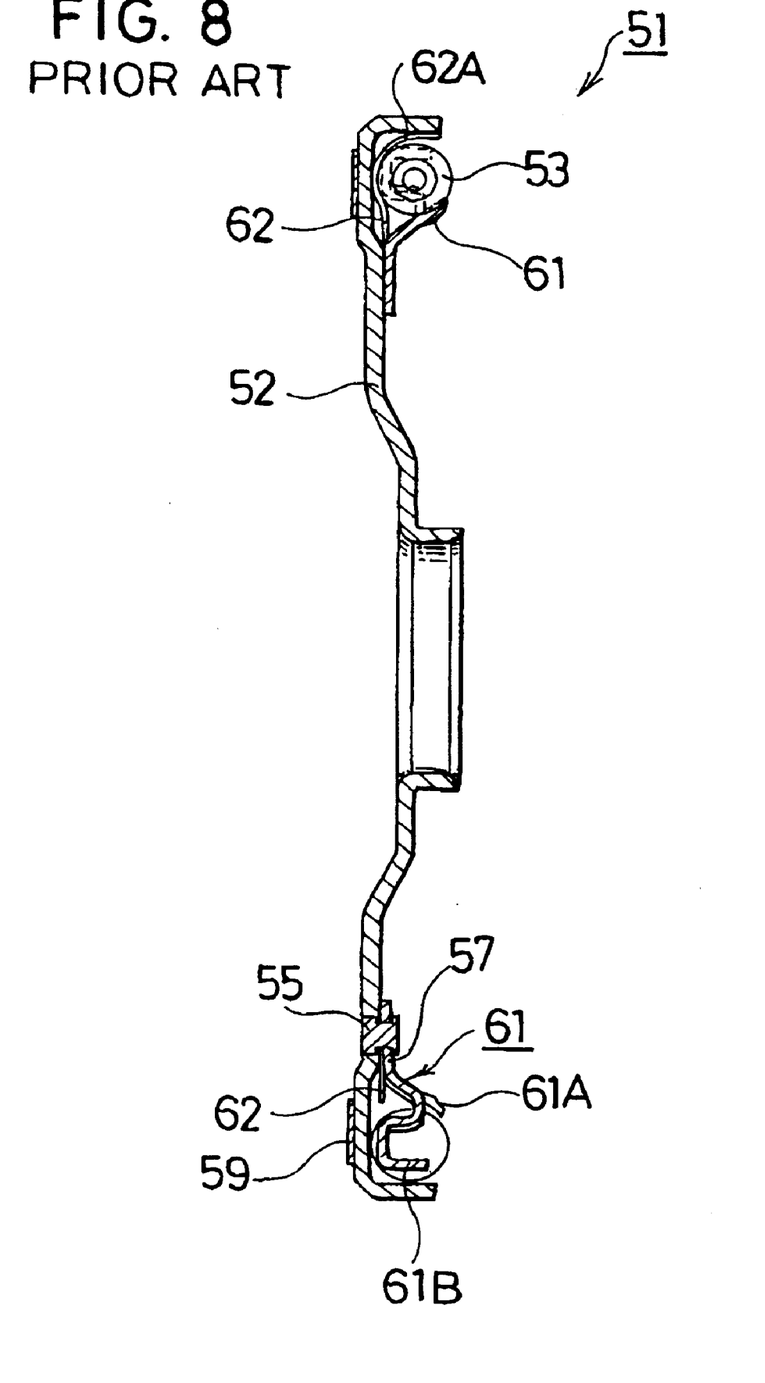
FIG. 8 is a cross-sectional view of the conventional spring assembly taken along line VIII—VIII of FIG. 7.

With reference to FIG. 7 through FIG. 11, a description will first be made of a conventional damper structure as used by way of example in a lockup clutch for a torque converter. FIG. 7 is a front view of a spring assembly 51, and FIG. 8 is a cross-sectional view taken along the line VIII—VIII of FIG. 7. Springs 53 are carried on their corresponding retainer plates 57. The retainer plates 57 are fixed on a core plate 52 by rivets 55 such that the retainer plates 57 are arranged with equal intervals. On opposite end portions of each spring 53, caps 58 are fitted such that the spring 53 can be pressed in a well-balanced state.

Each retainer plate 57 is composed of an upper plate 61 and a lower plate 62. The upper plate 61 is provided with a tab 61A and bent portions 61B. The tab 61 has been formed by slitting a part of the upper plate 61 and bending up the slit part, and holds the corresponding spring 53 at its inner periphery. The bent portions 61B extend along opposite ends of the spring 53, respectively, and support the spring 53 at its opposite ends. A bent portion 62A is arranged on and along an outer periphery of the lower plate 62, and supports and holds the spring 53 at its outer periphery.

Figure 9:
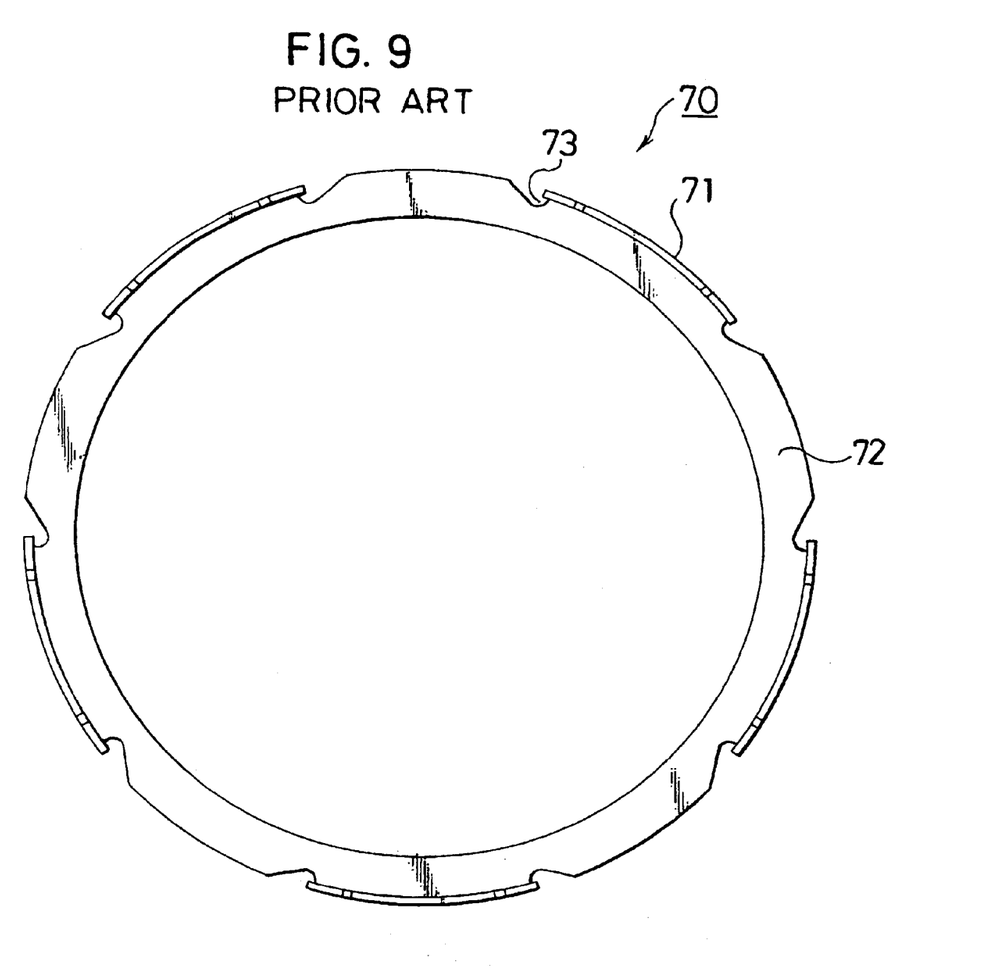
FIG. 9 is a front view of a driven plate in the conventional damper structure.
Figure 10:
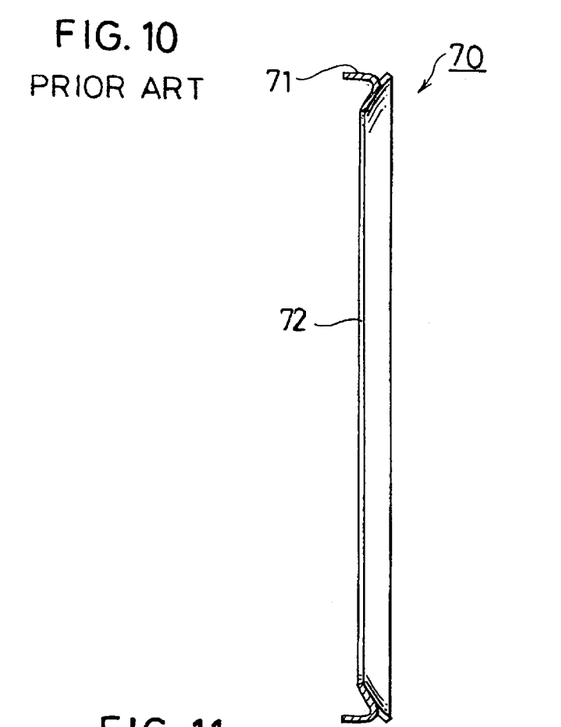
FIG. 10 is a cross-sectional view of the conventional driven plate taken in an axial direction of FIG. 9.

FIG. 9 is a front view of a conventional driven plate 70 in the conventional damper structure, and FIG. 10 is a cross-sectional view of the conventional driven plate 70 taken in an axial direction of FIG. 9. The driven plate 70 includes a ring-shaped core plate 72 and flanges 71 formed by bending up outer peripheral edge portions of the core plate 72. Adjacent opposite ends of each flange 71, the core plate 72 includes relieves 73 arranged to facilitate bending operation upon formation of the driven plate 70.

Figure 11:
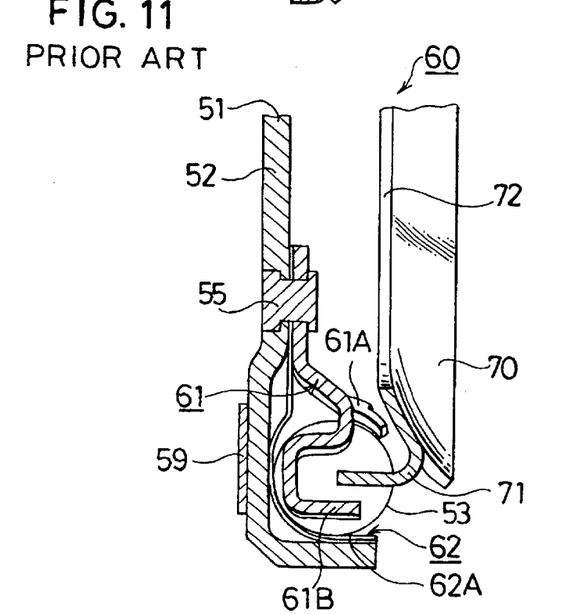
FIG. 11 is a fragmentary cross-sectional view illustrating an assembled state of the spring assembly and the driven plate in the conventional damper structure.

FIG. 11 illustrates the conventional damper structure 60 constructed in combination of the above-mentioned spring assembly 51 and the driven plate 70. As a result of pressing by the flanges 71 of the driven plate 70, said flanges 71 being counterpart members on the spring assembly 51, and the corresponding springs 53 against each other via the associated caps 58, power is transmitted between the side of the spring assembly 51 and the side of the driven plate 70. Vibrations, which occur at the time of the power transmission, are absorbed by the springs 53.

Numeral 59 indicates a friction member, which is required when the core plate 52 is arranged as a lockup piston.

In the conventional damper structure described above, the driven plate 70 is rotatable over a range of the angular interval between the adjacent springs 53 arranged in the spring assembly 51. Accordingly, the range of relative rotation between the driven plate 70 and the spring assembly 51 is large. Especially when the damper structure is used as a damper in a lockup clutch for a torque converter, large loads are applied to the springs because the damper is affected considerably by torque fluctuations of an engine as a power source. Accordingly, there has been a high potential risk that the springs may be permanently set in fatigue or may be broken.

SUMMARY OF THE INVENTION

An object of the present invention is, therefore, to provide a damper structure, which can limit an input of an excessive load onto each spring and can protect the spring from permanent setting in fatigue or breakage. Another object of the present invention is to provide a lockup clutch provided with the damper structure and suitable for use in a torque converter.

In one aspect of the present invention, there is thus provided a damper structure constructed of a core plate, a retainer plate fixed on the core plate, a spring assembly carried on the retainer plate and having at least one spring, and a driven plate arranged coaxially with the spring assembly and having a flange engageable with the spring, wherein the retainer plate is composed of an upper plate and a lower plate, the upper plate is provided with a lug portion formed by slitting a part of the upper plate and bending the slit part, the driven plate is provided with a stopper engageable with the lug portion. The stopper may preferably be arranged such that the stopper is brought into contact with the lug portion shortly before the spring would be fully compressed as a result of pressing by the spring and the flange against each other. Preferably, the spring assembly have a plurality of springs and the driven plate have a like plural number of flanges.

In another aspect of the present invention, there is also provided a lockup clutch suitable for use in a torque converter, wherein the lockup clutch comprises the above-described damper structure.

Owing to the above-described construction, the damper structure according to the present invention can bring about an advantageous effect that the spring or springs can be protected from permanent setting in fatigue or breakage.

DETAILED DESCRIPTION OF THE INVENTION AND PREFERRED EMBODIMENT

Figure 2:
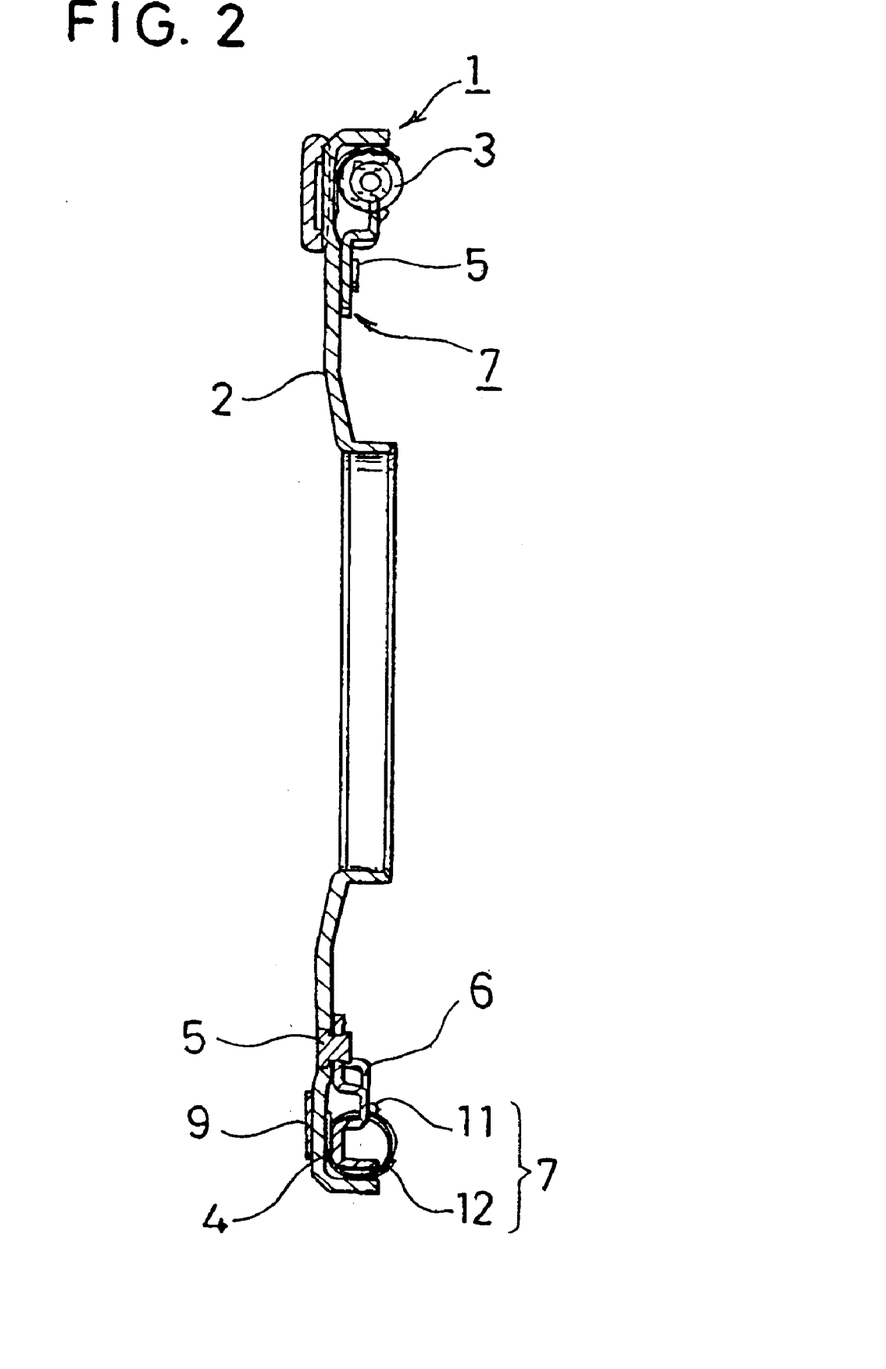
FIG. 2 is a cross-sectional view of the spring assembly taken along line II—II of FIG. 1.
Figure 6:
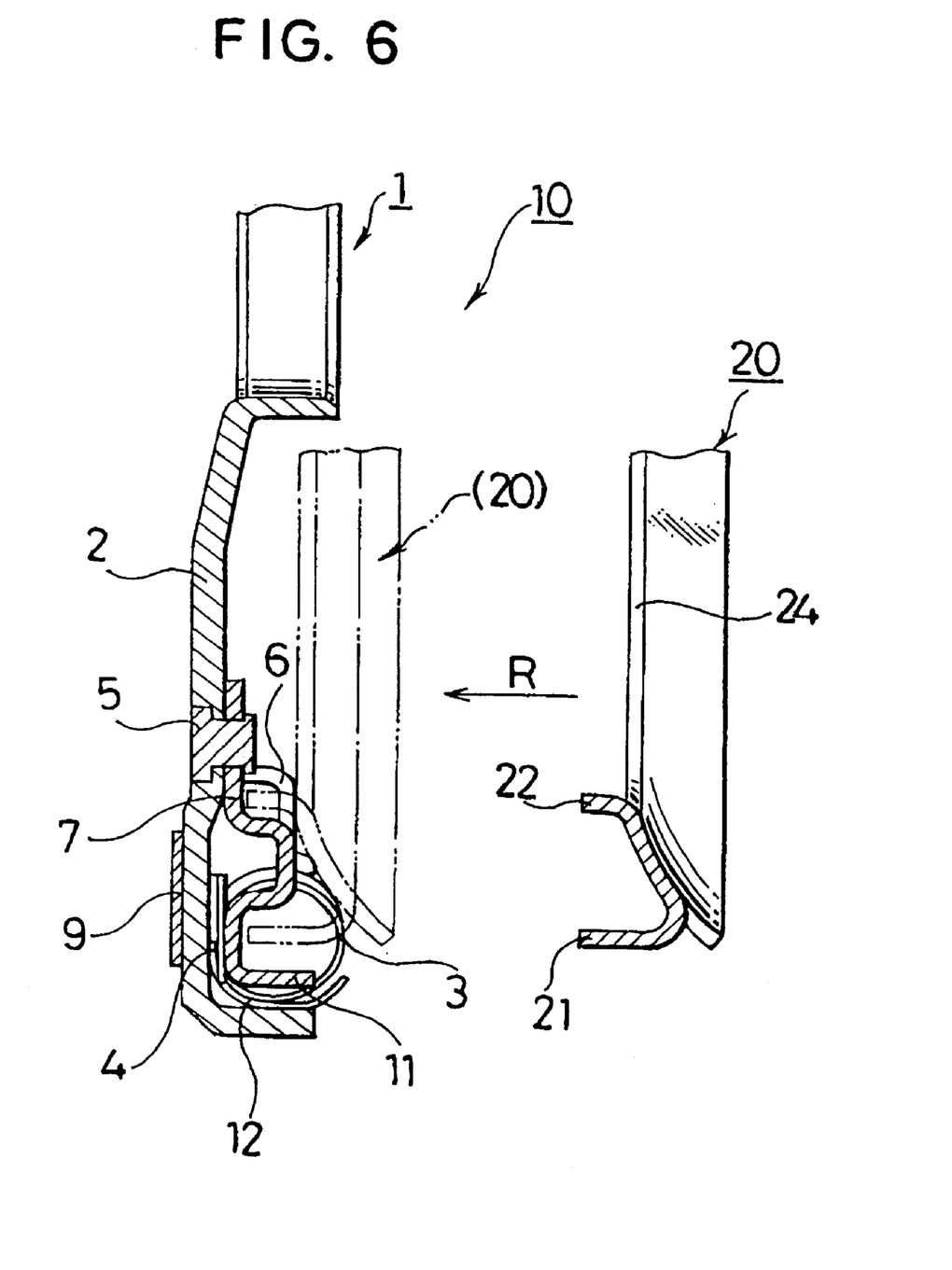
FIG. 6 is a fragmentary cross-sectional view illustrating an assembled state of the spring assembly and the driven plate in the damper structure according to the embodiment of the present invention.

Referring first to FIG. 2 and FIG. 6, the present invention will be described. A damper structure 10 is provided with a spring assembly 1 and a counterpart driven plate 20. In the spring assembly 1, each retainer plate 7 which carries thereon its corresponding spring 3 is composed of an upper plate 11 and a lower plate 12. A part of the upper plate 11 is slit and bent into a lug portion 6.

The driven plate 20, on the other hand, is constructed of a core plate 24. The core plate 24 is provided on an outer peripheral edge thereof with flanges 21 and on an inner peripheral edge thereof with stoppers 22. The flanges 21 are brought into engagement with their corresponding springs 3, while the stoppers 22 are brought into contact with their corresponding lug portions 6. Desirably, the stoppers 22 are configured and dimensioned to have a large area of contact so that bearing stress can be prevented from becoming high to lessen an impact of contact.

A description will next be made about an example in which the damper structure according to the embodiment of the present invention is applied to a lockup clutch suitable for use in a torque converter.

Figure 1:
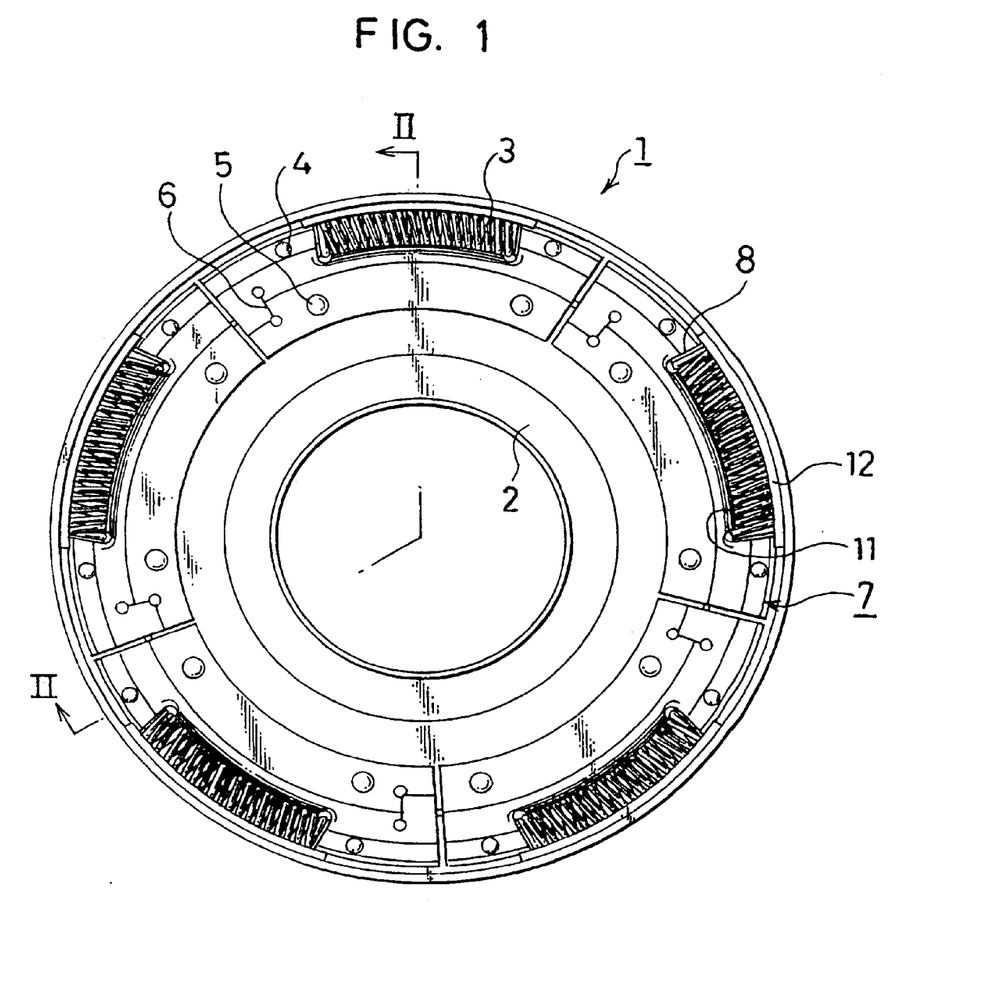
FIG. 1 is a front view of a spring assembly in a damper structure according to an embodiment of the present invention.

Reference will now be had to FIG. 1 and FIG. 2, which illustrate a core plate 2 as a lockup piston, the springs 3, and the retainer plates 7 with the corresponding springs 3 carried thereon. Each retainer plate 7 is composed of the upper plate 11 and the lower plate 12. The upper plate 11 is fixed on the core plate 2 by rivets 5, and by bent portions thereof, supports and holds the corresponding spring 3 on its inner peripheral side and at its opposite ends, respectively. Caps 8 are fitted on opposite end portions of each spring 3, respectively, such that the spring can be pressed in a well-balanced state. Up to here, the damper structure according the embodiment of the present invention is the same as the conventional damper structure.

The lower plate 12 is fixed on the upper plate 11 by rivets 4, and by a bent portion arranged on a side of its outer periphery, supports and holds the corresponding spring 3 at its outer peripheral side. Designated at numeral 9 is a friction member.

In this embodiment, a part of an inner peripheral section of each upper plate 11, said inner peripheral section being on the side of the rivets 5, is slit and bent into the lug portion 6 such that the lug portion 6 is located out of registration with a holding portion for the corresponding spring 3.

Figure 3A:
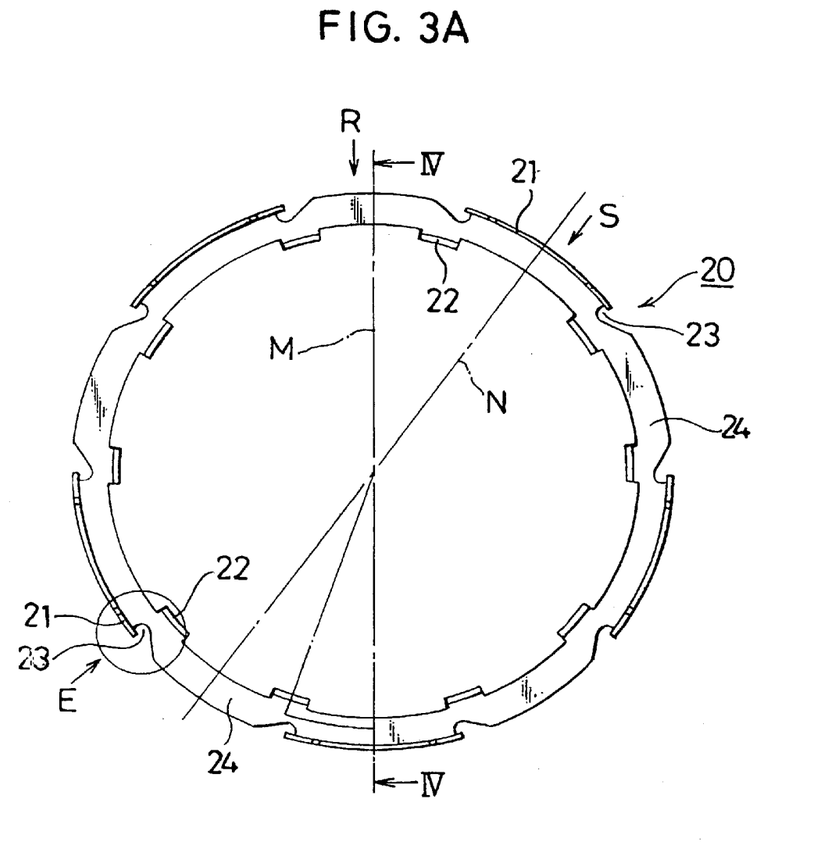
FIG. 3A is a front view of a driven plate in the damper structure according to the embodiment of the present invention.
Figure 4:
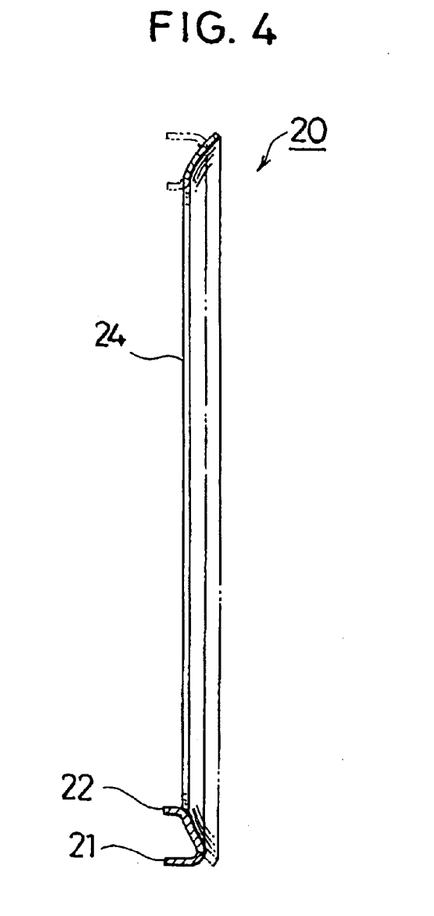
FIG. 4 is a cross-sectional view of the driven plate taken along line IV—IV of FIG. 3.
Figure 5:
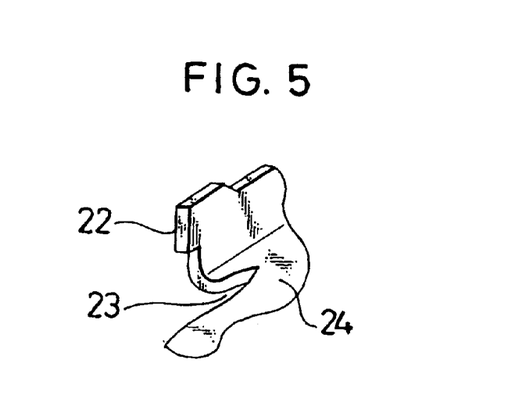
FIG. 5 is an enlarged perspective view of a section of the driven plate, which is indicated by the circle E in FIG. 3.

Reference will next be had to FIG. 3A, FIG. 4 and FIG. 5. In the driven plate 20, the ring-shaped core plate 24 is slit and bent up at several locations in an outer peripheral edge portion thereof such that the flanges 21 are formed. Further, the ring-shaped core plate 24 is also slit and bent at several locations in an inner peripheral edge portion thereof such that the stoppers 22 are formed for engagement with the corresponding springs 3 via the associated caps 8. Adjacent to opposite ends of each flange 21, the core plate 24 includes relieves 23 arranged to facilitate bending operation upon formation of the driven plate 20.

Figure 3B:
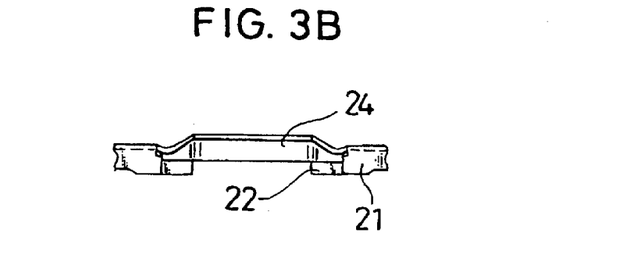
FIG. 3B is a fragmentary plan view of the driven plate as viewed in the direction R along the center line M of FIG. 3A.
Figure 3C:
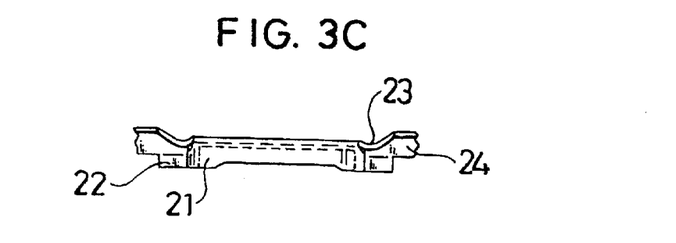
FIG. 3C is a fragmentary plan view of the driven plate as viewed in the direction S along the center line N of FIG. 3A.

A relationship between the core plate 24 and each flange 21 is illustrated in FIG. 3B and FIG. 3C.

FIG. 6 illustrates in cross-section the driven plate 20 and the spring assembly 1 in an assembled state 10 obtained by moving the driven plate 20 in the direction of arrow R and assembling it on the spring assembly 1. As a result of pressing of each spring 3 and its counterpart member in the spring assembly 3, that is, the corresponding flange 31 of the driven plate 20 against each other, power is transmitted between the side of the spring assembly 1 (i.e., the core plate 2 as the lockup piston) and the side of the driven plate 20, and vibrations occurred at the time of the power transmission are absorbed by the spring 3.

In the illustrated embodiment of the present invention, the stoppers 22 on the inner peripheral edge portion of the driven plate 20 are arranged at such locations that the stoppers 22 are brought into contact with the corresponding lug portions 6 shortly before the springs 3 would be fully compressed as a result of pressing by the springs 3 and their corresponding flanges 21 against each other. No particular limitation is imposed on the positional relationship between the stoppers 22 and their corresponding lug portions 6 insofar as they are brought into contact with each other before the springs 3 would be fully compressed. Nonetheless, it is preferred to arrange the stoppers 22 at such locations that the springs 3 are brought into as close to fully compressed forms as possible, because as the associated spring 3 becomes closer to its fully compressed form, the impact of a collision between each stopper 22 and its corresponding lug portion 6 becomes smaller and the absorption of vibrations, the principal function of the damper itself, is performed more effectively.

The damper structure according to the present invention has been described above based on the embodiment in which the damper structure was applied to the lockup clutch for the torque converter. However, the present invention is not limited to the illustrated embodiment and can be changed or modified as needed. For example, the numbers, shapes and the like of the springs, flanges, stoppers, etc. should not be limited to the above-described embodiment.

This application claims the priority of Japanese Patent Application 2000-126783 filed Apr. 27, 2000, which is incorporated herein by reference.

We claim:

1. A damper structure constructed of a core plate, a retainer plate fixed on said core plate, a spring assembly carried on said retainer plate and having at least one spring, and a driven plate arranged coaxially with said spring assembly and having a flange engageable with said spring, wherein:

said retainer plate is composed of an upper plate and a lower plate, and said upper plate is provided with a lug portion formed by slitting a part of said upper plate and bending said slit part; and said driven plate is provided with a stopper engageable with said lug portion.

2. A damper structure according to claim 1, wherein said stopper is arranged such that said stopper is brought into contact with said lug portion shortly before said spring would be fully compressed as a result of pressing by said spring and said flange against each other.

3. A damper structure according to claim 1, wherein said spring assembly has a plurality of springs, and said driven plate has a like plural number of flanges.

4. An lockup clutch suitable for use in a torque converter, wherein said lockup clutch comprises a damper structure as defined in claim 1.

5. A lockup clutch suitable for use in a torque converter, wherein said lockup clutch comprises a damper structure as defined in claim 2.

6. A lockup clutch suitable for use in a torque converter, wherein said lockup clutch comprises a damper structure as defined in claim 3.

* * * * *